United States Patent
Aygül et al.

(10) Patent No.: US 12,177,005 B2
(45) Date of Patent: Dec. 24, 2024

(54) PRIMARY USER EMULATION / SIGNAL JAMMING ATTACK DETECTION METHOD

(71) Applicant: Istanbul Medipol Universitesi, Istanbul (TR)

(72) Inventors: Mehmet Ali Aygül, Istanbul (TR); Haji Muhammed Furqan, Istanbul (TR); Mahmoud Nazzal, Istanbul (TR); Hüseyin Arslan, Istanbul (TR)

(*) Notice: Subject to any disclaimer, the term of this patent is extended or adjusted under 35 U.S.C. 154(b) by 365 days.

(21) Appl. No.: 17/786,353

(22) PCT Filed: Dec. 2, 2020

(86) PCT No.: PCT/TR2020/051212
§ 371 (c)(1),
(2) Date: Jun. 16, 2022

(87) PCT Pub. No.: WO2021/133312
PCT Pub. Date: Jul. 1, 2021

(65) Prior Publication Data
US 2023/0025147 A1    Jan. 26, 2023

(30) Foreign Application Priority Data
Dec. 25, 2019  (TR) ................ 2019/214461

(51) Int. Cl.
 H04B 17/345    (2015.01)
 H04K 3/00      (2006.01)
 H04W 12/00     (2021.01)

(52) U.S. Cl.
 CPC ..................... H04K 3/40 (2013.01)

(58) Field of Classification Search
 CPC ......... H04K 3/40; H04K 3/22; H04B 17/345; H04B 7/18565; H04B 7/18593; H04W 12/00
 See application file for complete search history.

(56) References Cited

U.S. PATENT DOCUMENTS

| | | | |
|---|---|---|---|
| 9,608,803 B2* | 3/2017 | Alahmadi | .......... H04N 21/2351 |
| 2010/0266002 A1* | 10/2010 | Du | .......... H04B 17/345 |
| | | | 375/224 |

(Continued)

FOREIGN PATENT DOCUMENTS

| CN | 104918261 A | 9/2015 |
|---|---|---|
| CN | 105743594 A | 7/2016 |

(Continued)

OTHER PUBLICATIONS

International Search Report for corresponding PCT/TR2020/051212, dated Apr. 2, 2021.

(Continued)

*Primary Examiner* — Andrew Wendell
(74) *Attorney, Agent, or Firm* — Egbert, McDaniel & Swartz, PLLC

(57) ABSTRACT

The method of the invention is related to utilizing the convergence patterns of sparse coding for detecting a primary user emulation/signal jamming attack in a cognitive radio setting. The method basically comprises a training stage and a testing stage. Through the method, the hypothesis which shows that there is no primary user but only noise ($H_0$), the hypothesis which shows that there is a legitimate primary user present with a right to use the spectrum and the secondary user should not use the spectrum ($H_1$), and the hypothesis which shows that there is a primary user emulator/signal jammer in the environment ($H_2$) can be distinguished.

3 Claims, 2 Drawing Sheets

(56) References Cited

U.S. PATENT DOCUMENTS

Figure 1:
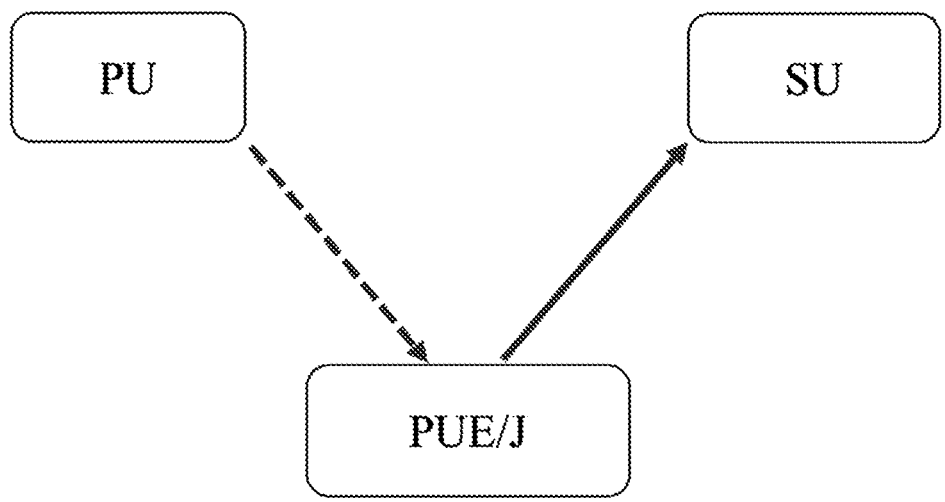

| | | | |
|---|---|---|---|
| 2013/0090145 A1* | 4/2013 | Wang | H04W 74/0816 |
| | | | 455/509 |
| 2017/0308701 A1* | 10/2017 | Nandha Premnath | G06F 21/53 |
| 2020/0107324 A1* | 4/2020 | Kim | H04W 72/0466 |

FOREIGN PATENT DOCUMENTS

| | | |
|---|---|---|
| CN | 110138479 A | 8/2019 |
| WO | 2009137205 A2 | 11/2009 |

OTHER PUBLICATIONS

Written Opinion of the International Searching Authority for corresponding PCT/TR2020/051212, dated Apr. 2, 2021.

\* cited by examiner

PRIMARY USER EMULATION / SIGNAL JAMMING ATTACK DETECTION METHOD

TECHNICAL FIELD

The invention is related to the detection of a primary user emulation/signal jamming attack. The invention is particularly related to utilizing the convergence patterns of sparse coding in the detection of primary user emulation/signal jamming attack.

PRIOR ART

Due to the rapid growth in wireless communication technology and services, the scarcity of wireless spectrum has become a major problem [1]. Cognitive Radio (CR) is one of the most promising solutions to bridge the gap between future wireless service requirements and spectrum scarcity. CR allows the sharing of the spectrum between primary users and secondary users [2]. Even though CR is a promising solution to remedy the spectrum scarcity problem, it is naturally vulnerable to both traditional and new security threats [3]. This originates from the nature of wireless systems and the unique properties of CR. Among the traditional security threats, eavesdropping, fraud, and signal jamming are included [4]. Among the new security threats, spectrum sensing data fraud (SSDF) and primary user emulation attacks (PUEA) [5] are notable examples. In an SSDF attack, a malicious CR produces false data to lower the performance of a collaborative spectrum sensing approach. On the other hand, a PUEA attempts to imitate the transmission characteristics in order to deceive the secondary users and prevent them from using the existing spectrum spaces [5]. In each case, developing new and effective solutions for detecting attacks is an important requirement for a practical and safe CR system.

In literature, various approaches were suggested for the detection of signal jamming and primary user emulation attack (PUEA). In [6], it was indicated that the signal can be a guide on the power level source by means of energy detection. Energy detection-based approaches are simple but they have a high-level of false alarm rate. The natural physical properties of the wireless channel and communication devices are effective for PUEA detection as well [7] [8] [9]. That being said, applying these techniques requires extra software and hardware overheads. Localization-based detection is popular for PUEA detection as well. The fundamental idea is to determine the location of the signal source by using the received signal and comparing the previously known locations of legitimate primary users (PU) with a database. However, these techniques can be used only in the case of static primary user scenarios [10] [11]. At the same time, compressed sensing (CS), which is used in various application areas [12] is used in the detection of a primary user emulation attack (PUEA) as well. The studies in this field include PUEA detection based on CS and a signal power received [13]. This approach requires many sensors throughout the network and is rather complicated. Another example discusses taking advantage of the belief propagation algorithm and CS for the detection of PUEA [14]. Again, a central node is required for this application.

Patent document CN105743594 (A) of the prior art suggests a method based on the cooperation between users for the detection of a primary user emulation attack (PUEA) in CR systems. The method is based on the signal energy schemes of the user and the attacker; however, it does not propose any recommendation related to sparse coding. In addition, in this document, no machine learning-based classification procedure is mentioned As a result, due to the shortcomings described above and the insufficiency of the present solutions on the subject, an improvement in the related technical field is required.

AIMS OF THE INVENTION

The invention has been formed by being inspired from the present situations and it aims to solve the above-mentioned disadvantages.

The main aim of the invention is to detect a primary user emulator/signal jamming attack.

Another aim of the invention is to design dictionaries connected to the real channel corresponding to the sparse coding of the distorted signal received and corresponding to the legitimate primary user and to suggest algorithms for the detection of signal jamming and primary user emulation attacks on the cognitive radio.

Another aim of the invention is to utilize the convergence patterns characterized by sparse coding residual signal energy convergence rates with these dictionaries to distinguish a spectrum space, a legal user or a signal jammer/emulator.

Another aim of the invention is to distinguish between these hypotheses during the detection of an attack:

The hypothesis which shows that there is no primary user but only noise ($H_0$)

The hypothesis which shows that there is a legitimate primary user present with a right to use the spectrum and the secondary user should not use the spectrum ($H_1$) and The hypothesis which shows that there is a primary user emulator/signal jammer in the environment ($H_2$)

In order to fulfill the purposes described above, a primary user emulator/signal jamming attack detection method of the invention basically involves a training stage and a testing stage.

The aforementioned training stage comprises the process steps of;

Combining the channel corresponding to the legitimate primary user and a random data set for each of the said three signals mentioned, and calculating a dictionary dependent on a primary user, Subjecting each one of the aforementioned three signals to a sparse coding (SC) process with this dictionary ($D_{PU}$) to obtain classification features. Those features are the sparse coding residual energy profile. This profile is obtained by quantifying the convergence pattern of sparse coding over that dictionary ($D_{PU}$ in terms of the residual norm ($|r|_2$). This pattern can be quantified by calculating the absolute gradient ($|G|$) of the residual norm ($|r|_2$). Sparse representation can be obtained using, for example, greedy sparse coding algorithms such as the orthogonal matching pursuit algorithm.

Obtaining a classification model with the class tags as a result of a machine learning (ML)-based classification procedure from the aforementioned training feature vectors.

The said testing stage comprises the process steps of;

Obtaining a dictionary as a result of the dictionary calculation from the sampled data with the channels corresponding to legitimate users, Performing sparse coding over the said dictionary for each test signal, and providing feature extraction, Giving the extracted feature vector to the classifier together with the classifier model, The said classifier makes a decision regarding the hypothesis corresponding to the present testing signal in question.

The structural and characteristic features of the invention and all of the advantages will be understood more clearly with the figures given below and the detailed description written by making references to these figures, and therefore, the evaluation should be made in consideration of these figures and the detailed description.

FIGURES AIDING THE DESCRIPTION OF THE INVENTION

Figure 2:
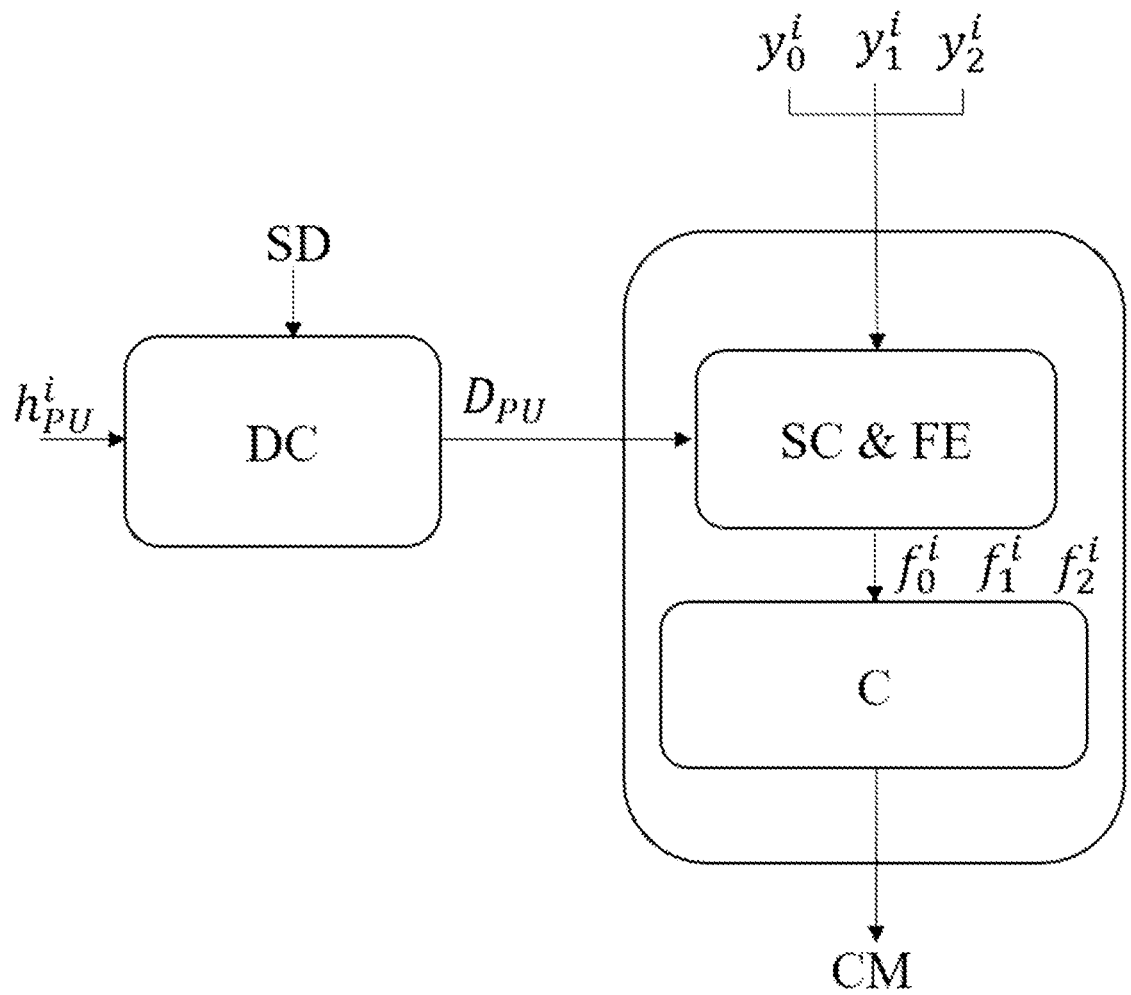
Figure 3:
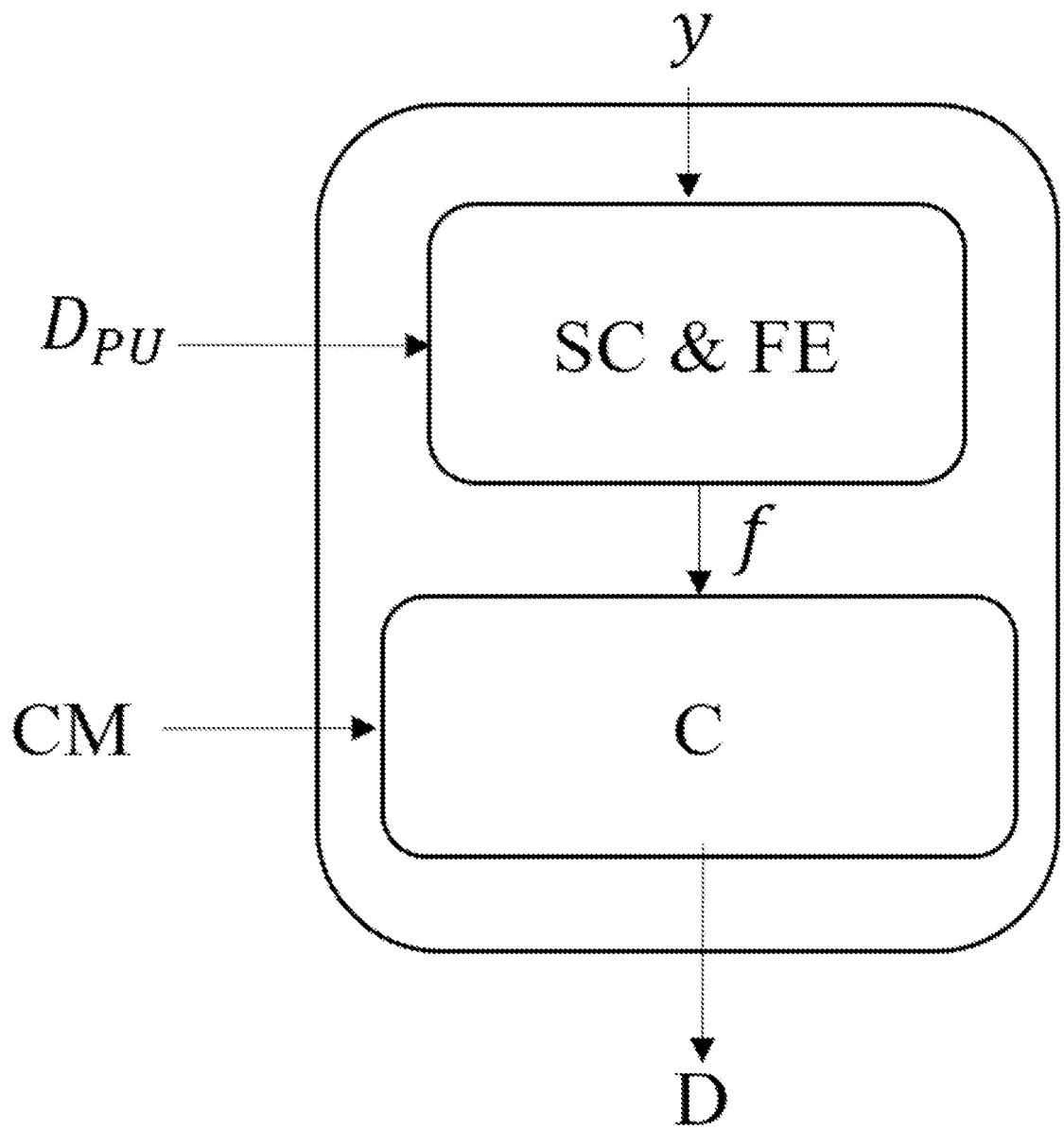

FIG. 1 is the schematic view of a primary user emulator/signal jammer in the environment, FIG. 2 is the schematic view of the training stage of a primary user emulator/signal jammer detection method of the invention, FIG. 3 is the schematic view of the testing stage of a primary user emulator/signal jammer detection method of the invention.

DESCRIPTION OF THE REFERENCES OF THE PARTS OF THE INVENTION

PU: Primary user
SU: Secondary user
PUE/J: Primary user emulator/signal jammer
SD: Sampled dictionary
$h^i_{PU}$: Channel corresponding to legitimate primary user
$h_{PU}$: Channels corresponding to legitimate users
DC: Dictionary calculation
$D_{PU}$: Dictionary connected to a legitimate primary user
$y_0^i$: The signal corresponding to the hypothesis which shows that there is no primary user but only noise
$y_1^i$: The signal corresponding to the hypothesis which shows that there is a legitimate primary user present with a right to use the spectrum and the secondary user should not use the spectrum
$y_2^i$: The signal corresponding to the hypothesis which shows that there is a primary user emulator/signal jammer in the environment
$f_0^i$: The feature data corresponding to the hypothesis which shows that there is no primary user but only noise
$f_1^i$: The feature data corresponding to the hypothesis which shows that there is a legitimate primary user with a right to use the spectrum and the second user should not use the spectrum
$f_2^i$: The feature data corresponding to the hypothesis which shows that there is a primary user emulator/signal jammer in the environment
y: Test signal
f: Feature data
SC: Sparse coding
FE: Feature extraction
C: Classification
CM: Classified model
D: Decision

DETAILED DESCRIPTION OF THE INVENTION

In this detailed description, the method and system which provides the phase and frequency synchronization of the invention are explained in order for the subject to be better understood.

The system model in which the method of the invention uses is shown in FIG. 1. This model comprises a legitimate primary user (PU) node, a secondary user (SU) node, and an illegal node (primary user emulator/signal jammer (PUE/J). The secondary user (SU) node desires to benefit from the spectrum in the presence of an illegal node which can start a signal jammer attack or primary user emulator attack (PUEA). While a legitimate primary user (PU) node and primary user emulator (PUE) transmit structured signals, the signal jammer sends a random signal. The signal sent from any node is in the form of $y=h_x+n$. The $h_x$ expresses the general channel vector (or matrix) between any transmitter-receiver pair; n expresses additive white Gaussian noise. Due to the spatial de-correlation concept, the channel $h_x$ between different transmitter-receiver pairs is different [1]. The general channel between the transmitter and receiver nodes is based on the channel model presented on $h_x$ [2].

The said method basically comprises two stages as the training stage and testing stage.

FIG. 2 shows the training stage involved in the method of the invention. In the training stage, the test signals of $y_0^i$, which corresponds to $H_0$ hypothesis, $y_1^i$ which corresponds to $H_1$ hypothesis, $y_2^i$ which corresponds to $H_2$ hypothesis are used. According to this, the training stage comprises the following process steps respectively:

Combining the channel corresponding to the legitimate primary user (PU) ($h^i_{PU}$) and the randomly chosen data set (SD) for each of the said three signals, and calculating a dictionary ($D_{PU}$) that is dependent on a primary user (PU), Subjecting each one of said three signals to a sparse coding (SC) process over the dictionary ($D_{PU}$). Sparse coding can be achieved using any sparse recovery algorithm such as the orthogonal matching pursuit algorithm. While performing sparse coding, the energy (norm) of the representation residual signal ($|r|_2$) is calculated for each iteration. Then, the decay of the residual energy is quantified in terms of its absolute gradient ($|G|$) to give rise to a so-called residual energy profile. This profile is adopted as the classification feature data point (f) corresponding to the received signal of interest, Obtaining a classification model (CM) with the class tags as a result of the machine learning (ML) based classification (C) procedure from said training feature vectors.

In a preferred embodiment of the method of the invention, the feature data $f_0^i$, $f_1^i$, $f_2^i$ are added to the training feature vectors they correspond to, as 0, 1 and 2, respectively, and thereby the attack is detected.

In another preferred embodiment of the method of the invention, the dictionary ($D_{PU}$) calculation process is carried out by using the equation of $D_{PU}=h_{PU}*SD$. The * in this equation expresses convolution.

FIG. 3 comprises the testing stage of the method of the invention. Accordingly, the said testing stage comprises the process steps of:

Obtaining a dictionary ($D_{PU}$) as a result of the dictionary calculation (DC) of the sampled data (SD) with the channels ($h_{PU}$) corresponding to legal users, For each test signal (y), performing sparse coding (SC) via the said dictionary ($D_{PU}$) and making a feature extraction (FE), Giving the extracted feature data point (f) to the classifier (C) with the classifier model (CM), The said classifier (C) making a decision (D) regarding the hypothesis corresponding to the present feature data (f) in question.

REFERENCES

[1] Y. Arjoune and N. Kaabouch, "A comprehensive survey on spectrum sensing in cognitive radio networks: Recent advances, new challenges, and future research directions," Sensors, vol. 19, no. 1, p. 126, 2019.

[2] T. Yucek and H. Arslan, "A survey of spectrum sensing algorithms for cognitive radio applications," IEEE Commun. Surveys Tuts., vol. 11, no. 1, pp. 116-130, First 2009.

[3] A. G. Fragkiadakis, E. Z. Tragos, and I. G. Askoxylakis, "A survey on security threats and detection techniques in cognitive radio networks," IEEE Commun. Surveys Tuts., vol. 15, no. 1, pp. 428-445, First 2013.

[4] B. Wang, Y. Wu, K. J. R. Liu, and T. C. Clancy, "An anti jamming stochastic game for cognitive radio networks," IEEE J. Sel. Areas Commun., vol. 29, no. 4, pp. 877-889, April 2011.

[5] D. Chaitanya and K. M. Chari, "Performance analysis of puea and ssdf attacks in cognitive radio networks," in Computer Communication, Networking and Internet Security. Springer, 2017, pp. 219-225.

[6] F. Jin, V. Varadharajan, and U. Tupakula, "Improved detection of primary user emulation attacks in cognitive radio networks," in 2015 International Telecommunication Networks and Applications Conference (ITNAC), November 2015, pp. 274-279.

[7] S. U. Rehman, K. W. Sowerby, and C. Coghill, "Radio-frequency fingerprinting for mitigating primary user emulation attack in low-end cognitive radios," IET Communications, vol. 8, no. 8, pp. 1274-1284, 2014.

[8] W. Chin, C. Tseng, C. Tsai, W. Kao, and C. Kao, "Channel-based detection of primary user emulation attacks in cognitive radios," in 2012 IEEE 75th Vehicular Technology Conference (VTC Spring), May 2012, pp. 1-5.

[9] N. T. Nguyen, R. Zheng, and Z. Han, "On identifying primary user emulation attacks in cognitive radio systems using nonparametric Bayesian classification," IEEE Trans. Signal Process, vol. 60, no. 3, pp. 1432-1445, March 2012.

[10] R. Chen, J. Park, and J. H. Reed, "Defense against primary user emulation attacks in cognitive radio networks," IEEE J. Sel. Areas Commun., vol. 26, no. 1, pp. 25-37, January 2008.

[11] N. Patwari and S. K. Kasera, "Robust location distinction using temporal link signatures," in Proceedings of the 13th Annual ACM International Conference on Mobile Computing and Networking, ser. MobiCom '07. New York, NY, USA: ACM, 2007, pp. 111-122.

[12] X. Zhang, Y. Ma, Y. Gao, and S. Cui, "Real-time adaptively regularized compressive sensing in cognitive radio networks," IEEE Trans. Veh. Technol., vol. 67, no. 2, pp. 1146-1157, February 2018.

[13] F. Ye, X. Zhang, Y. Li, and H. Huang, "Primary user localization algorithm based on compressive sensing in cognitive radio networks," Algorithms, vol. 9, no. 2, 2016.

[14] S. Maric, A. Biswas, and S. Reisenfeld, "A complete algorithm to diagnose and alleviate the effects of physical layer attacks," in 2017 International Conference on Signals and Systems (ICSigSys), May 2017, pp. 29-34.

The invention claimed is:

1. A method for detecting a primary user emulator/signal jammer (PUE/J), characterized in that it uses the following trio:
   a signal ($y_0^i$) corresponding to the hypothesis ($H_0$), which shows that there is no primary user (PU) but only noise,
   a signal ($y_1^i$) corresponding to the hypothesis ($H_1$), which shows that there is a legitimate primary user (PU) with a right to use the spectrum and that the secondary user (SU) should not use the spectrum,
   a signal ($y_2^i$) corresponding to the hypothesis ($H_2$), which shows that there is a primary user emulator/signal jammer (PUE/J) in the environment,
and it comprises a training stage comprising the process steps of:
   combining the channel corresponding to the legal primary user (PU) ($h_{PU}^i$) and the randomly chosen data set (SD) for each of the said three signals, and calculating a dictionary ($D_{PU}$) that is dependent on a primary user (PU),
   subjecting each one of said three signals to a sparse coding (SC) process with this dictionary ($D_{PU}$) during the calculation of the absolute gradient (|G|) combined with a sparse coding algorithm such as the orthogonal matching pursuit algorithm calculating the residual energy profile ($|r|_2$) and the corresponding training feature vector and finding the feature data (f) corresponding to each of the three hypotheses with this process,
   obtaining a classification model (CM) with the class tags as a result of the machine learning (ML) based classification (C) procedure from said training feature vectors,
and a testing stage comprising the process steps of:
   obtaining a dictionary ($D_{PU}$) as a result of the dictionary calculation (DC) of the sampled data (SD) with the channels ($h_{PU}$) corresponding to legal users,
   performing sparse coding (SC) via the said dictionary ($D_{PU}$) for each test signal (y), and making a feature extraction (FE),
   giving the extracted feature vector to the classifier (C) together with the classifier model (CM),
   the said classifier (C) making a decision (D) regarding the hypothesis corresponding to the present feature data (f) in question.

2. A method for the detection of a primary user emulator/signal jammer (PUE/J) attack according to claim 1, characterized by the addition of the signals of $f_0^i$, $f_1^i$, $f_2^i$ to the training feature vectors to which they correspond to, as 0, 1 and 2 respectively and thereby detecting the attack using these features.

3. A method for the detection of a primary user emulator/signal jammer (PUE/J) attack according to claim 1, characterized by the dictionary ($D_{PU}$) calculation process being carried out by using the equation of $D_{PU}=h_{PU}*SD$.

* * * * *